(12) United States Patent
Kim (10) Patent No.: US 9,331,611 B2
(45) Date of Patent: May 3, 2016

(54) METHOD FOR CONTROLLING SYNCHRONOUS SWITCH CHANGE IN MEDIUM VOLTAGE INVERTER

(71) Applicant: LSIS CO., LTD., Anyang-si, Gyeonggi-do (KR)

(72) Inventor: Kyungsue Kim, Gyeonggi-do (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/570,929

(22) Filed: Dec. 15, 2014

(65) Prior Publication Data

US 2015/0188460 A1 Jul. 2, 2015

(30) Foreign Application Priority Data

Dec. 31, 2013 (KR) .......................... 10-2013-0168392

(51) Int. Cl.
*H02P 4/00* (2006.01)
(52) U.S. Cl.
CPC .......................................... *H02P 4/00* (2013.01)
(58) Field of Classification Search
CPC ........................................................ H02P 4/00
USPC .................................. 318/570, 560, 567, 569
See application file for complete search history.

(56) References Cited

U.S. PATENT DOCUMENTS 3,982,170 A * 9/1976 Gritter ................... H02K 17/42
322/32
2012/0187886 A1 7/2012 Mack et al.

FOREIGN PATENT DOCUMENTS

| JP | 61-161993 | 7/1986 |
| JP | 63-011090 | 1/1988 |
| JP | 05-300789 | 11/1993 |

OTHER PUBLICATIONS

Hyundai Heavy Industries, "MV AC Drive-N5000," Hyundai Medium Voltage Inverter-N5000 Catalog, May 2013, 36 pages.
Korean Intellectual Property Office Application Serial No. 10-2013-0168392, Office Action dated Aug. 17, 2015, 4 pages.
Japan Patent Office Application Serial No. 2014-263237, Office Action dated Jan. 26, 2016, 3 pages.

* cited by examiner

*Primary Examiner* — David S Luo
(74) *Attorney, Agent, or Firm* — Lee, Hong, Degerman, Kang & Waimey PC; Jonathan Kang; Justin Lee

(57) ABSTRACT

A method for controlling synchronous switching in a medium voltage inverter is disclosed. The method includes lighting on a first lamp to notify that a switching operation is ready by ascertaining that the medium voltage inverter is in a normal operation, lighting on a second lamp to notify that a switching operation is under way when receiving an input of switching action, and lighting on a third lamp to notify that the switching operation is completed when the switching action is completed.

9 Claims, 6 Drawing Sheets

METHOD FOR CONTROLLING SYNCHRONOUS SWITCH CHANGE IN MEDIUM VOLTAGE INVERTER

CROSS-REFERENCE TO RELATED APPLICATIONS

Pursuant to 35 U.S.C. §119(a), this application claims the benefit of earlier filing date and right of priority to Korean Patent Application No. 10-2013-0168392, filed on Dec. 31, 2013, the contents of which are hereby incorporated by reference herein in its entirety.

BACKGROUND

1. Field of the Disclosure

The present disclosure relates to a synchronous switching control method of a medium voltage inverter.

2. Discussion of the Related Art

In a medium voltage inverter, electrical impacts by various causes are applied to a motor, an inverter, and a commercial power source, during the switching action between an inverter output power source and a commercial power source.

The electrical impact is generated by the instantaneous intermittence section which is generated in a section which the switches of the commercial power source and the inverter are both opened during the switching action. In order to reduce the electrical impact caused by the voltage generated while the voltage inputted to the motor is switched from the invert output to the commercial power source, the magnitude and phase of the inverter output and the commercial power source should be adjusted as identical to each other.

Figure 1:
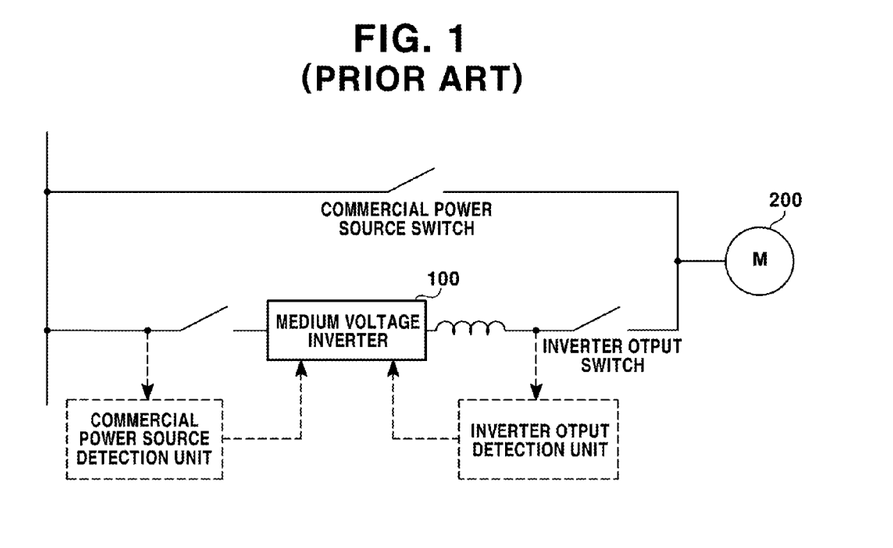
FIG. 1 is an exemplary view illustrating synchronous switching of a conventional medium voltage inverter.

FIG. 1 is an exemplary view illustrating synchronous switching of a conventional medium voltage inverter.

In a conventional medium voltage inverter system, an output voltage is measured at a back end of the reactor, and the medium voltage inverter (100) compensates the phase delay of the voltage generated by the reactor. As such, when the switching operation is made after the commercial power source and the inverter output voltage are in synchronization, the electrical impacts generated by the voltage difference may be considerably reduced.

However, because the conventional medium inverter synchronous switching as illustrated in FIG. 1 is to control ON or OFF of switches in a situation where the high-voltage power source is applied, the malfunction of switching operation may lead to a high-voltage accident.

In addition, when the switch of the commercial power source is maintained in a ON status while the medium inverter is driving the motor, both of the power sources are applied to both ends of the reactor, and then a current is generated by the voltage difference between both of the power sources, which may lead to an accident in the medium voltage inverter and the commercial power source. And in the situation where a large amount of current is flowing due to a large voltage difference, there may be generated problems such as overcurrent cutoff of the commercial power source, overcurrent malfunction of the medium voltage inverter, etc.

SUMMARY OF THE DISCLOSURE

The technical challenge which the present disclosure intends to achieve is, to provide a medium voltage inverter synchronous switching control method to safely control the synchronous switching of the medium voltage inverter, by providing pilot lamps to notify a user of synchronous switching operation status of the medium voltage inverter.

In order to complete the aforementioned technical challenge, in one general aspect of the present disclosure, there may be provided a method for controlling a system configured to supply an electric power to a motor by switching a first switch connected to a medium voltage inverter to a second switch connected to a commercial power source, the method comprising: lighting on a first lamp to notify that a switching operation is ready, by ascertaining that the medium voltage inverter is in a normal operation, and ascertaining that the first switch is turned on and the second switch is turned off; receiving an input of a third switch to notify that a switching to a bypass mode is made and an input of a fourth switch to request to start a switching operation; lighting on a second lamp to notify that a switching operation is under way; synchronizing a current of the medium voltage inverter with that of the motor; turning on the second switch, and turning off the first switch; and lighting on a third lamp to notify that the switching operation is completed.

In some exemplary embodiment of the present disclosure, the method may further comprise stopping an operation of the medium voltage inverter along with lighting-on of the third lamp.

In some exemplary embodiment of the present disclosure, the method may further comprise lighting off the third lamp when receiving an input of the third switch to turn off the switching operation.

In some exemplary embodiment of the present disclosure, the lighting-on of the second lamp may include turning off the first lamp along with lighting-on of the second lamp.

In some exemplary embodiment of the present disclosure, the lighting-on of the third lamp may include turning off the second lamp along with lighting-on of the third lamp.

In another general aspect of the present disclosure, there is provided a method for controlling a system configured to supply an electric power to a motor by switching a first switch connected to a commercial power source to a second switch connected to a medium voltage inverter, the method comprising: lighting on a first lamp to notify that a switching action is ready, by ascertaining that the medium voltage inverter is in a normal operation, and ascertaining that the first switch is turned on and the second switch is turned off; receiving an input of a third switch to notify that a switching to an inverter mode is made and an input of a fourth switch to request to start a switching operation; lighting on a second lamp to notify that a switching operation is under way; synchronizing a current of the medium voltage inverter with that of the motor; turning on the second switch, and turning off the first switch; and lighting on a third lamp to notify that the switching operation is completed.

In some exemplary embodiment of the present disclosure, the method may further comprise lighting off the third lamp, when receiving an input of the third switch to turn off the switching operation.

In some exemplary embodiment of the present disclosure, the lighting-on of the second lamp may include turning off the first lamp along with lighting-on the second lamp.

In some exemplary embodiment of the present disclosure, the lighting-on of the third lamp may include turning off the second lamp along with lighting-on of the third lamp.

According an exemplary embodiment of the present disclosure, a malfunction of the synchronous switching may be prevented in advance and the synchronous switching may be safely controlled, by notifying a user of the synchronous switching operation status such as 'ready', 'under way', and 'completed'.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Hereinafter, referring to enclosed figures, an exemplary embodiment of the present disclosure will be described in detail.

Figure 2:
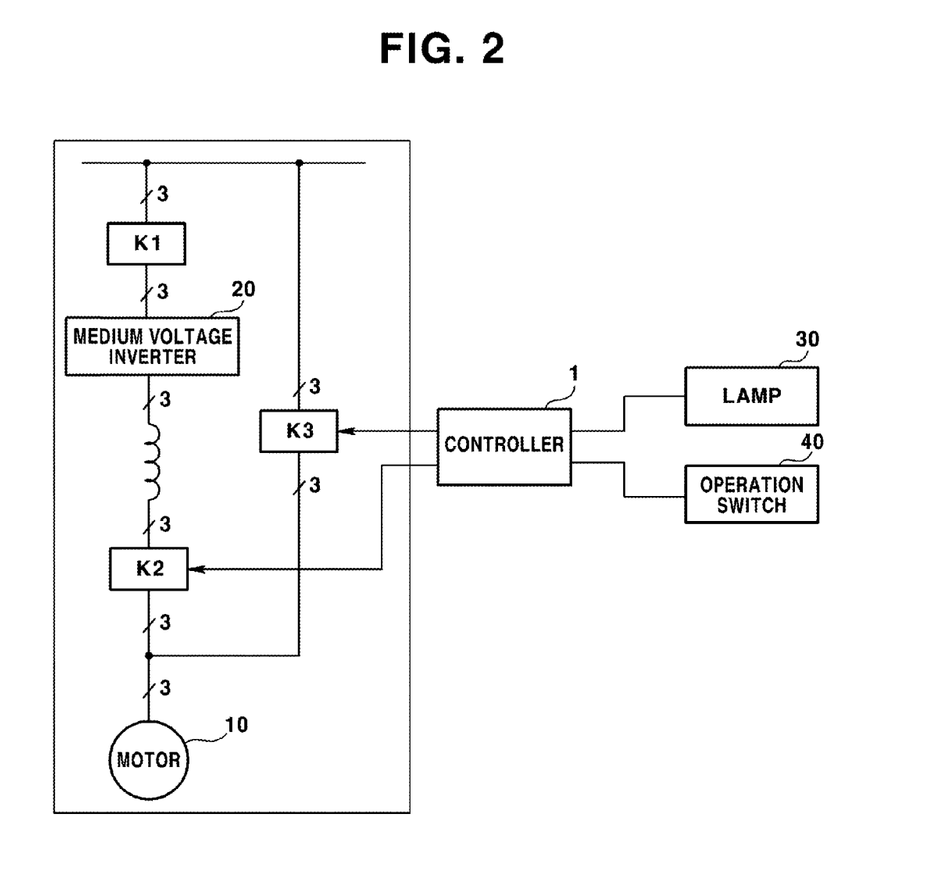
FIG. 2 is an exemplary view briefly illustrating a structure of a medium voltage inverter synchronous switching system according to an exemplary embodiment of the present disclosure.

FIG. 2 is an exemplary view briefly illustrating a structure of a medium voltage inverter synchronous switching system according to an exemplary embodiment of the present disclosure.

As illustrated in FIG. 2, the motor (10) is in an inverter mode, when the switch K2 is ON and the switch K3 is OFF, to receive an input of power source from the medium inverter (20). When the switch K2 is OFF and the switch K3 is ON, the motor (10) is in a bypass mode to receive an input of the commercial power source. According to an exemplary embodiment of the present disclosure, the controller (1) may visibly notify a user of the synchronous switching operation status by receiving a selection signal according to the user's switch selection from the operation switch (40) and then controlling the synchronous switching between the inverter mode and the bypass mode along with controlling lighting-on of the lamp (30). The operations of the controller (1) will be described later with more details.

Meanwhile, to describe an exemplary embodiment of the present disclosure, although the controller (1) is illustrated as being arranged outside of the medium voltage inverter (20), the controller (1) may be also arranged inside of the medium voltage inverter (20). In addition, the lamp (30) and the switch (40) may be arranged in the exterior case of the medium voltage inverter (20).

Figure 3:
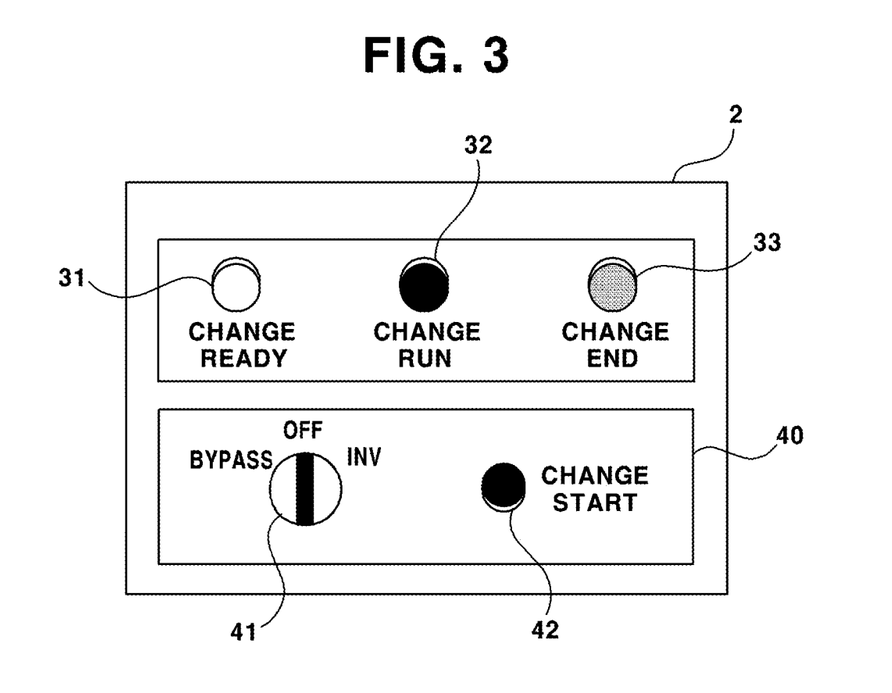
FIG. 3 is an exemplary view illustrating lamps and operation switches to notify the synchronous switching operation status arranged outside of a medium voltage inverter according to an exemplary embodiment of the present disclosure.

FIG. 3 is an exemplary view illustrating lamps and operation switches to notify the synchronous switching operation status arranged outside of a medium voltage inverter according to an exemplary embodiment of the present disclosure. This is for description of detailed structure of the lamp (30) and the operation switch (40) illustrated in FIG. 2.

As illustrated in FIG. 3, according to an exemplary embodiment of the present disclosure, the lamp (30) to notify the synchronous switching operation status may include a first lamp (31) to notify that the synchronous switching operation is ready, a second lamp (32) to notify that the synchronous switching operation is under way, and a third lamp (33) to notify that the synchronous switching operation is completed.

Each of the first to third lamps (31 to 33) are may be turned on in different colors. For example, the first lamp (31) may be turned on in yellow; the second lamp (32) may be turned on in red; and the third lamp (33) may be turned on in green.

The method for synchronous switching control according to an exemplary embodiment of the present disclosure may prevent accidents caused by malfunctions relating to the synchronous switching and enable the user to easily recognize the synchronous switching operation status, by defining the synchronous operation sequences.

As described in the above, the operation sequences according to an exemplary embodiment of the present disclosure is defined as a bypass mode switching and a inverter mode switching, and the operation of each sequence may be expressed in a way for the user to easily recognize through the lamp (30). In addition, the operation sequence may be switched from a 'READY' status where the synchronous switching function is initiated and waiting for a user command to a 'RUN' status after the user inputs a functional operation command. In the 'RUN' status, the synchronous switching (switching between the bypass mode and the inverter mode) may be performed. In addition, when the operation of the switch is completed by completion of the synchronous switching, the status may be switched to an 'END' status and the synchronous switching function may be completed. Here, the 'READY' operation, the 'RUN' operation, and the 'END' operation may be displayed for the user to recognize, by the first lamp (31), by the second lamp (32), and by the third lamp (33), respectively.

Meanwhile, the synchronous switching operation switch (40) may include a first operation switch (41) to select the bypass mode or the inverter mode and a second operation switch (42) to select a start of the synchronous switching operation.

The first operation switch (41) may be formed so as to be able to select one mode among the three of a bypass mode (BYPASS), an off mode (OFF), and an inverter mode (INV). The second operation switch (42), as a start switch of the synchronous switching operation in a push-button type, may be formed to be inputted only when in a situation where one of the bypass mode or the inverter mode is selected. However, because the switching type of the first and the second switch is exemplary, therefore it is apparent that the present is not limited hereto. That is to say, the second operation switch (42) may not be formed in a push-button type, but in other various types including a touch-button type.

In addition, as illustrated in FIG. 3, according to an exemplary embodiment of the present disclosure, the lamp (30) and the operation switch (40) may be formed in a single panel simultaneously to be adhered exteriorly on the motor (10) or the inverter (20), or may be formed in separate panels.

Figure 4:
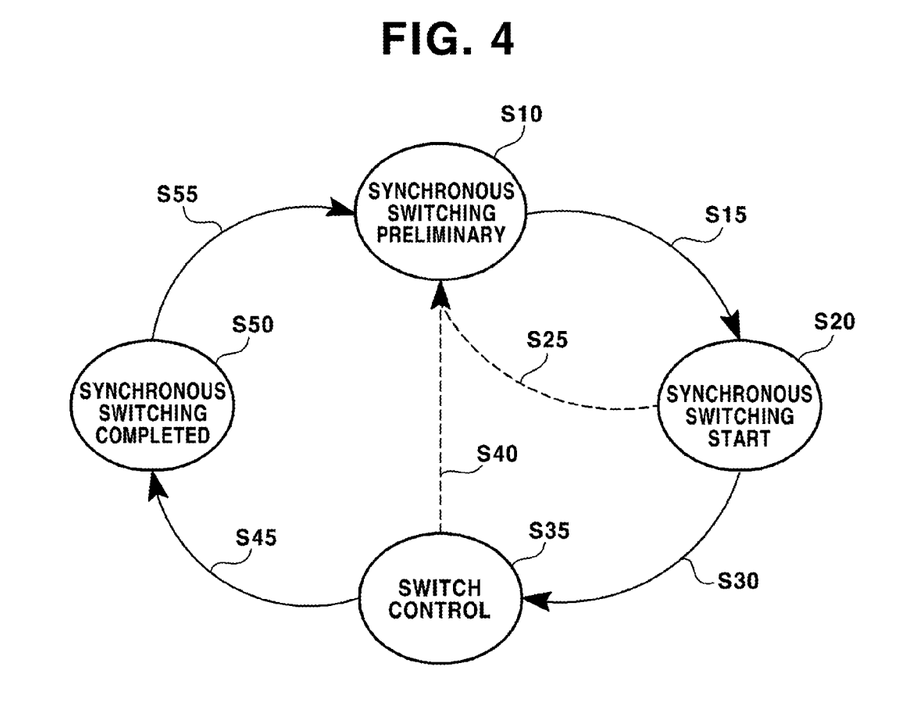
FIG. 4 is an exemplary brief flow chart illustrating synchronous switching control according to an exemplary embodiment of the present disclosure.

FIG. 4 is an exemplary brief flow chart illustrating synchronous switching control according to an exemplary embodiment of the present disclosure.

As illustrated in FIG. 4, according to an exemplary embodiment of the present disclosure, at first, the controller (1) performs the following preliminary inspection (S10) relating to the synchronous switching.

(i) The controller (1) may ascertain whether the use of synchronous switching is permitted in the setting of the medium voltage inverter.

(ii) The controller (1) may determine the mode of synchronous switching by ascertaining what the power to the motor is and whether ON or OFF status of the switch.

Here, when the switch K2 is ON and the switch K3 is OFF, the synchronous switching may be performed to the bypass mode. On the other hand, when the switch K2 is OFF and the switch K3 is ON, the synchronous switching may be performed to the inverter mode.

(iii) The controller (1) may ascertain whether the medium voltage inverter (20) is in a normal operation and may perform the synchronous switching.

When all of (i) to (iii) in the above are satisfied, the controller (1) may light on the first lamp (31), and the user may turn the first operation switch (41) to select a mode and select the second operation switch (42) to start the synchronous switching, to enable the synchronous switching to be performed (S15). At this time, the controller (1) may start the synchronous switching (S20). When any one of the (i) to (iii) is not satisfied, the user input may be ignored and the operation may be maintained to be in the synchronous switching preliminary inspection (S10).

When the synchronous switching is started (S20), the controller (1) may perform the synchronization and light on the second lamp (32).

That is, the controller (1) may synchronize the commercial power source with an output voltage of the medium voltage inverter (20) and operate the switches K2 and K3 in the start of the synchronous switching (S20). When the switch K2 is ON and the switch K3 is OFF and the medium voltage inverter (20) is in a normal operation in S10, when the user turns the first operation switch (41) to the bypass mode and pushes the second operation switch (42), the medium voltage inverter (20) may perform the synchronous switching to the bypass mode. In addition, when the switch K2 is OFF and the switch K3 is ON and the medium voltage inverter (20) is in a normal operation in S10, and when the user turns the first operation switch (41) to the inverter mode and pushes the second operation switch (42), the medium voltage inverter (20) may perform the synchronous switching to the inverter mode.

When the synchronization consumes more time than a predetermined time (for example, 10 seconds), the controller (1) may regard this as a synchronization failure and change the status (S25) into the initial synchronous switching preliminary inspection (S10), and notify the user of a synchronization failure alarm. For this purpose, the controller (1) may further include a notifying unit (for example, a displaying unit).

In addition, when the synchronization is completed within a predetermined time, the controller (1) may change the status into a switch control status (S30). At this time, the controller (1) may prepare for the switch control.

When the medium voltage inverter (20) completes the synchronization in S20, the controller (1) may control the switches K2 and K3 to change the status (S35). The second lamp (32) may be lighted on also in this stage.

That is, the controller (1) may turn on the switch K3 and turn off the switch K2 when switching to the bypass mode. Otherwise, the controller (1) may turn on the switch K2 and turn off the switch K3 when switching to the inverter mode. At this moment, when the switch status changing consumes more time than a predetermined time (for example, 200 ms), the controller (1) may regard this as a synchronous switching failure and change the status into the initial synchronous switching preliminary inspection (S10) (S40), and notify the user of a synchronous switching failure alarm.

When the statuses of the switches K2 and K3 are properly changed, the controller may be changed into the status of synchronous switching completed (S45).

In the status of synchronous switching completed, the controller may process the synchronous switching completion (S50), and may turn back to the initialization (S10). At this moment, the controller (1) may light on the third lamp (33).

That is, when the synchronous switching is completed, by ascertaining the operation status of the medium voltage inverter (2) and according to the ascertained mode, the controller (1) may stop the medium voltage inverter (2) when the mode is switched to the bypass mode. Otherwise, when the mode is switched to the inverter mode, the controller (1) may ascertain that the medium voltage inverter (2) is driving the motor (10).

In the result of ascertaining, when the driving status is not normal, the controller (1) may notify the user that a failure has occurred. When the ascertained driving status is normal, the controller (1) may light on the third lamp (33) and maintain the light-on-status of the third lamp (33) until the user changes the first operation switch (41) to OFF. When the user changes the first operation switch (41) to OFF, the controller (1) may return to S10 and turn off the third lamp (33).

Figure 5:
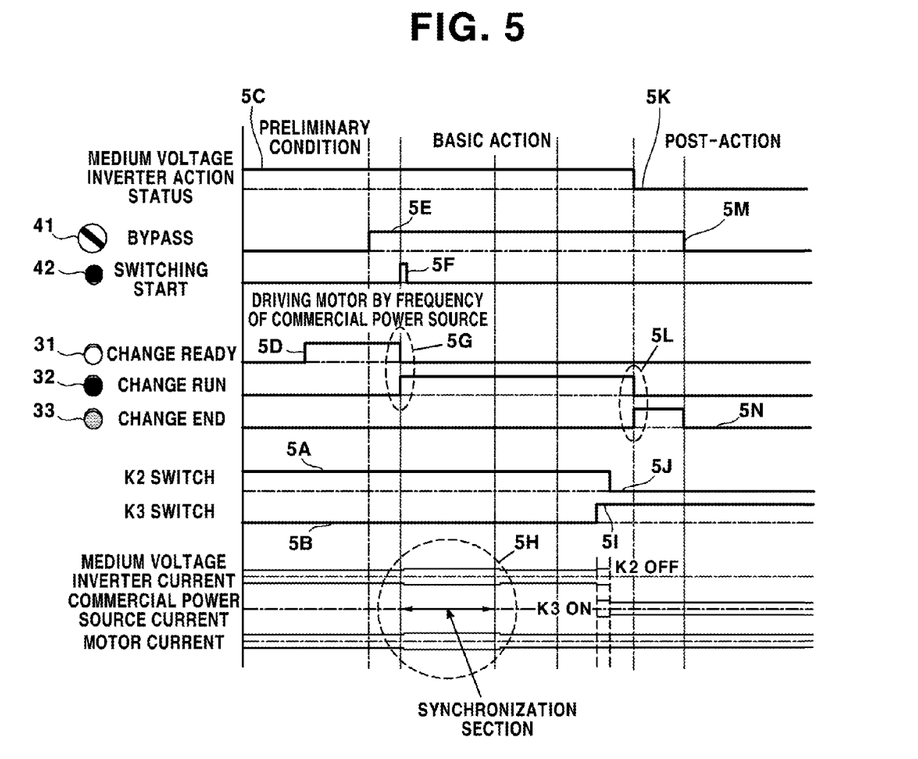
FIGS. 5 and 6 are exemplary views illustrating time charts for describing synchronous switching control according to an exemplary embodiment of the present disclosure.
Figure 6:
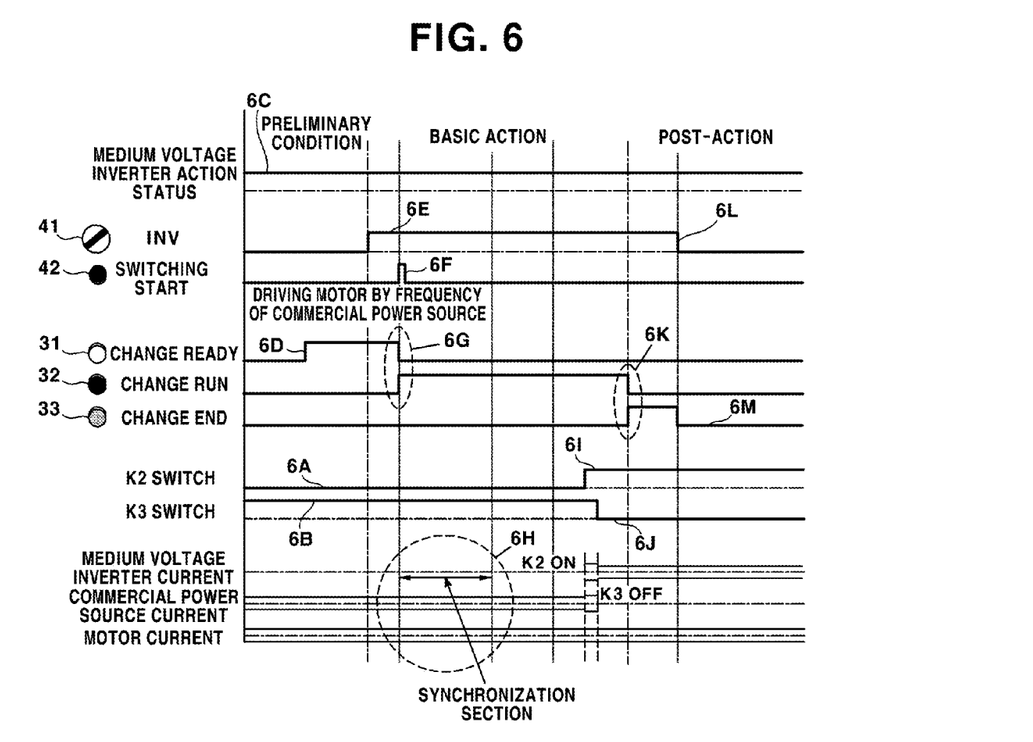

FIGS. 5 and 6 are exemplary views illustrating time charts for describing synchronous switching control according to an exemplary embodiment of the present disclosure. FIG. 5 is illustrating the synchronous switching to the bypass mode, and FIG. 6 is illustrating the synchronous switching to the inverter mode.

As illustrated in FIG. 5, the controller (1) may ascertain whether the use of synchronous switching of the medium inverter is permitted. When the controller (1) ascertains that the switch K2 is ON (5A) and the switch K3 is OFF (5B) and the medium voltage inverter (20) is normally operating (5C), the controller (1) may light on the first lamp (31) (5D) to notify the user that the switching operation is ready.

When the user changes the first operation switch (41) to the bypass mode (5E) and selects the second operation switch (42) (5F), the controller (1) may turn off the first lamp (31) and light on the second lamp (32) (5G) to perform synchronization of currents of the medium voltage inverter (20) and the motor (10) (5H).

When the synchronization is completed, the controller (1) may turn on switch K3 (5I) and turn off the switch K2 (5J). And then the controller (1) may stop the operation of the medium voltage inverter (20) (5K), and turn off the second lamp (32) and light on the third lamp (33) (5L).

Afterwards, when the user changes the first operation switch (41) from the bypass mode to OFF (5M), the controller (1) may turn off the third lamp (33) (5N).

Thus, the controller (1) may perform the switching action from the inverter mode to the bypass mode.

Meanwhile, as illustrated in FIG. 6, when performing the synchronous switching from the bypass mode to the inverter mode, the controller (1) may ascertain whether the use of synchronous switching of the medium inverter is permitted. When the controller (1) ascertains that the switch K2 is OFF (6A) and the switch K3 is ON (6B) and the medium voltage inverter (20) is normally operating (6C), the controller (1) may light on the first lamp (31) (6D) to notify the user that the switching operation is ready.

When the user changes the first operation switch (41) to the bypass mode (6E) and selects the second operation switch (42) (6F), the controller (1) may turn off the first lamp (31) and light on the second lamp (32) (6G) to perform synchronization of currents of the medium voltage inverter (20) and the motor (10) (6H).

When the synchronization is completed, the controller (1) may turn on the switch K2 (6I) and turn off the switch K3 (6J).

And then the controller (1) may turn off the second lamp (32) and light on the third lamp (33) (6K).

Afterwards, when the user changes the first operation switch (41) from the inverter mode to OFF (6L), the controller (1) may turn off the third lamp (33) (6M).

Thus, the controller (1) may perform the switching action from the bypass mode to the inverter mode.

The system which is able to perform the synchronous switching automatically controls the medium inverter output switch K2 and the commercial power source switch K3. In case the control is malfunctioning, it may lead a serious accident. An exemplary embodiment of the present disclosure is to prevent this accident.

The user may start the synchronous switching only when the signal is 'READY'. When the signal is 'RUN', the user may confirm the status of synchronous switching action.

That is, according to an exemplary embodiment of the present disclosure, the synchronous switching may be controlled safely, by displaying the synchronous switching status such as 'ready', 'under way', or 'completed' to the user.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims.

What is claimed is:

1. A method for controlling a system configured to supply an electric power to a motor by switching a first switch connected to a medium voltage inverter to a second switch connected to a commercial power source, the method comprising:

lighting on a first lamp to notify that a switching operation is ready, by ascertaining that the medium voltage inverter is in a normal operation, and ascertaining that the first switch is turned on and the second switch is turned off;

receiving an input of a third switch to notify that a switching to a bypass mode is made and an input of a fourth switch to request to start a switching operation;

lighting on a second lamp to notify that a switching operation is under way;

synchronizing a current of the medium voltage inverter with that of the motor;

turning on the second switch, and turning off the first switch; and lighting on a third lamp to notify that the switching operation is completed.

2. The method of claim 1, further comprising:
    stopping an operation of the medium voltage inverter along with lighting-on of the third lamp.

3. The method of claim 1, further comprising:
    lighting off the third lamp when receiving an input of the third switch to turn off the switching operation.

4. The method of claim 1, wherein the lighting-on of the second lamp includes turning off the first lamp along with lighting-on of the second lamp.

5. The method of claim 1, wherein the lighting-on of the third lamp includes turning off the second lamp along with lighting-on of the third lamp.

6. A method for controlling a system configured to supply an electric power to a motor by switching a first switch connected to a commercial power source to a second switch connected to a medium voltage inverter, the method comprising:

lighting on a first lamp to notify that a switching action is ready, by ascertaining that the medium voltage inverter is in a normal operation, and ascertaining that the first switch is turned on and the second switch is turned off;

receiving an input of a third switch to notify that a switching to an inverter mode is made and an input of a fourth switch to request to start a switching operation;

lighting on a second lamp to notify that a switching operation is under way;

synchronizing a current of the medium voltage inverter with that of the motor;

turning on the second switch, and turning off the first switch; and lighting on a third lamp to notify that the switching operation is completed.

7. The method of claim 6, further comprising:
    lighting off the third lamp, when receiving an input of the third switch to turn off the switching operation.

8. The method of claim 6, wherein the lighting-on of the second lamp includes turning off the first lamp along with lighting-on the second lamp.

9. The method of claim 6, wherein the lighting-on of the third lamp includes turning off the second lamp along with lighting-on of the third lamp.

* * * * *